United States Patent [19]

Paget

[11] 4,142,800
[45] Mar. 6, 1979

[54] AUTOMATIC LEVEL

[75] Inventor: Pierre C. Paget, Ligny en Barrois, France

[73] Assignee: Essilor International (Compagnie Generale d'Optique), a French Societe Anonyme, Joinville le Pont, France

[21] Appl. No.: 751,037

[22] Filed: Dec. 16, 1976

[30] Foreign Application Priority Data

Dec. 18, 1975 [FR] France .................. 75 38828

[51] Int. Cl.² .............................................. G01C 1/00
[52] U.S. Cl. ..................................... 356/250; 350/10; 350/47
[58] Field of Search ................. 356/149, 250; 350/47, 350/10

[56] References Cited

U.S. PATENT DOCUMENTS

| 2,638,032 | 5/1953 | Kieffer et al. | 350/47 |
| 2,981,141 | 4/1961 | Armstrong et al. | 356/250 |
| 3,220,297 | 11/1965 | Baker et al. | 356/250 |
| 3,610,764 | 10/1971 | Huther | 350/10 |
| 3,729,266 | 4/1973 | Mason et al. | 356/250 |

FOREIGN PATENT DOCUMENTS

| 773829 | 12/1967 | Canada | 350/47 |
| 878463 | 9/1961 | United Kingdom | 356/250 |

Primary Examiner—Vincent P. McGraw

[57] ABSTRACT

This automatic level comprises an optical compensator for non-horizontality, an image erecting device and an optical focusing system. The compensator, the image erector and the focusing system consist of an assembly of three reflecting element disposed in the fashion of a "Crova" prism, two of said reflecting elements being disposed on a support suspended from the case of the apparatus by means of a pair of flexion bars so selected that said two reflecting elements rotate through an angle equal to one-half the angle formed by the optical axes of the objective and eyepiece of the level with respect to the horizontal when the case departs slightly from its horizontal position, the distance between said objective and one of said two reflecting elements being equal to the distance between other of said two reflecting elements and the reticule, and the third and intermediate reflecting element is movable in a substantially vertical direction.

4 Claims, 6 Drawing Figures

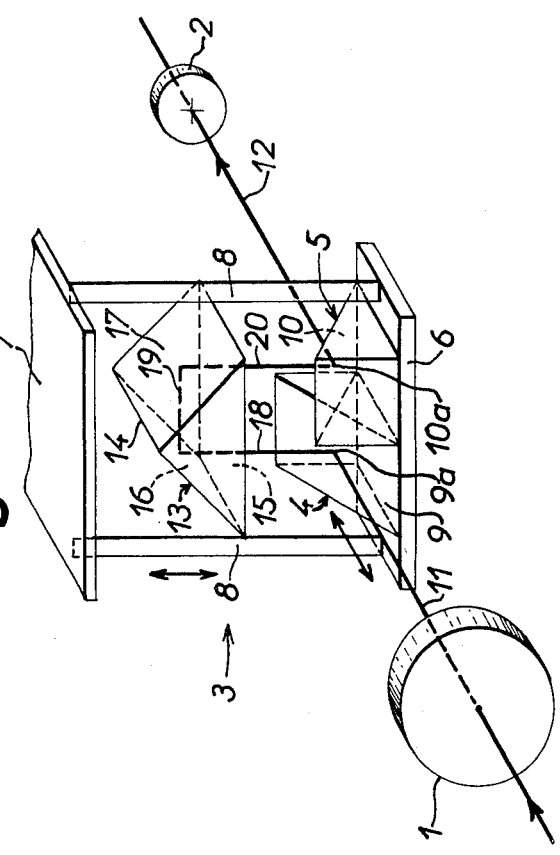

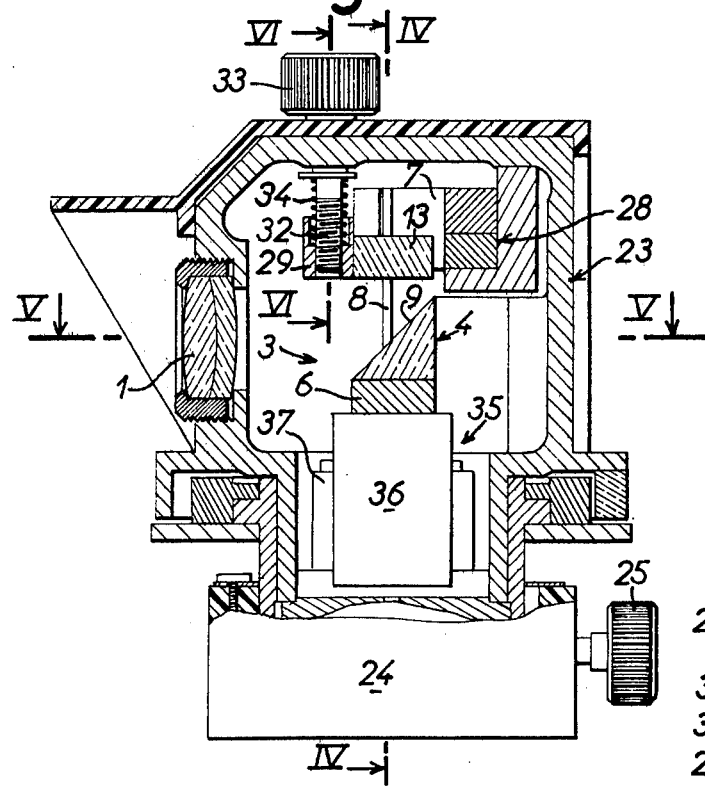
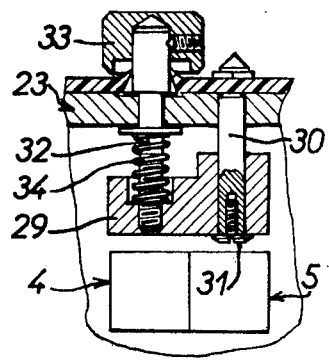
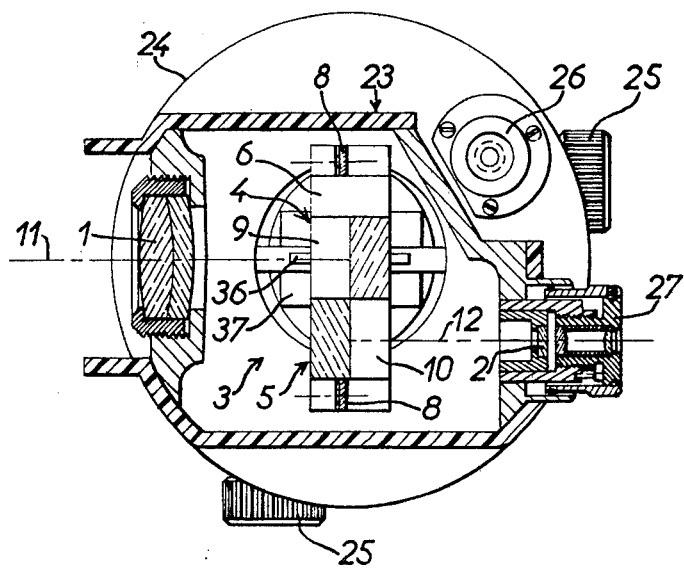

AUTOMATIC LEVEL

BACKGROUND OF THE INVENTION.

1. Field of the Invention.

This invention relates in general to automatic levels and has specific reference to an automatic level of the type comprising a case, a base supporting said case, means permitting a coarse adjustment on the horizontally of said case, an objective and an eyepiece mounted in said case so that their optical axes be parallel to each other and horizontal when the case is in a horizontal position, a fixed reticule disposed in the object focal plane of the eyepiece, an optical compensating system suspended from said case by means of flexion bars and disposed on the path of the light rays between said objective and said reticule, an image erecting system disposed between said objective and said reticule, and an image focusing device.

2. Description of the Prior Art.

It is known that in levels it is essential that the line of sight be exactly horizontal, or in other words that the horizontal light ray passing through the center of the lens also passes through the center of the reticule, even if the level case is not strictly horizontal. The adjustment means generally provided on the level base and an air bubble level carried by the level case are not sufficient for achieving this result, for they afford only a coarse or rough adjustment of the level horizontality.

Therefore, means had to be provided for automatically compensating the defective horizontality of the level case, so that the line of sight be perfectly horizontal after setting the level in position and a rough adjustment of its horizontality.

Many compensating systems have already been proposed for automatic levels. As a rule, these compensating systems utilize mirrors or prisms with a pendular suspension or with a flexion bar suspension, in order to provide a reflecting surface forming a constant angle with the vertical. Compensating systems of this type have been disclosed notably in U.S. Pat. No. 3,628,874 and in French Pat. Nos. 1,386,114; 2,162,534 and 2,189,709. Other automatic levels utilize a liquid blade having a reflecting surface remaining constantly horizontal for compensating the lack of horizontality. Typical automatic levels of this kind are illustrated and described in the British Pat. No. 859,617 and in the French Pat. No. 2,221,788.

On the other hand, the objective of a level forms an image of the sighted object which is inverted both from right to left and from top to bottom. Therefore, some known automatic levels incorporate an optical image erecting system. This system may consist of means differring completely from the compensating system, as disclosed for example in the French Pat. No. 2,036,372 providing for this purpose a prism consisting of one portion of an Abbe prism, which accomplishes a complete erection of the image. In the other case, the image erecting system is sometimes combined with the compensating system, as illustrated for example in the French Pat. Nos. 1,386,114 and 2,162,534. However, in these two last-mentioned documents the image is not erected completely but only in the top to bottom direction.

Finally, in known automatic levels, an image focusing device is also contemplated which consists in general of an optical system separate from the compensating system and also from the image erecting system, this focusing device consisting as a rule of a vehicle incorporating a divergent optical system.

From the foregoing it is clear that hitherto known automatic levels comprises a relatively great number of separate optical systems for compensating the insufficient horizontality, partially or totally erecting the image, and focusing the image. Obviously, this combination of means increases considerably the cost of the apparatus as well as its over-all dimensions.

SUMMARY OF THE INVENTION.

It is the primary object of the present invention to avoid the above-listed inconveniences of hitherto known automatic levels by providing a particularly simple and compact automatic level comprising a reduced number of optical elements forming a single assembly and capable of accomplishing at the same time the compensation, the complete image erection and the image focusing.

To this end, the invention provides an automatic level of the above-mentioned type, wherein the compensator, the image erecting system and the focusing device comprise an assembly of three reflecting elements disposed in the fashion of a "Crova" prism or "2nd-species Porro" prism, said assembly comprising an input reflecting element, and intermediate reflection element and an output reflecting element, said input and output reflecting elements being disposed on a support suspended from the case of the level by means of a pair of flexion bars so selected that the input and output reflecting elements can rotate through an angle equal to one-half of an angle formed by the optical axes of said objective and eyepiece, respectively, with the horizontal when the case departs slightly from its horizontal position, the distance between the objective and the input reflecting element, as measured along the optical axis of the objective, being equal to the distance between the output reflecting element and the reticule, as measured along the optical axis of the eyepiece, and wherein the intermediate reflecting element is movable in a substantially vertical direction.

With this arrangement, the input and output reflecting elements ensure both the compensation and partly of the image erection, more particularly the image erection in the top to bottom direction, whereas the intermediate reflecting element ensures the image erection in the left to right direction and also the focusing by virtue of its mobility.

BRIEF DESCRIPTION OF THE DRAWINGS.

The present invention will now be described more in detail with reference to the accompanying drawings, in which:

FIG. 1 is a diagrammatic perspective view showing the essential component elements of the compensating, image-erecting and focusing assembly incorporated in the automatic level according to this invention.

FIG. 2 is a diagram illustrating the compensation obtained with the assembly shown in FIG. 1.

FIG. 3 is a vertical sectional view of an automatic level according to this invention, in the case of a concrete embodiment of the invention.

FIG. 4 is another vertical section taken along the line IV—IV of FIG. 3.

FIG. 5 is a horizontal section taken along the line V—V of FIG. 3, and

FIG. 6 is a fragmentary sectional view taken along the line VI—VI of FIG. 3, showing a detail.

DESCRIPTION OF THE PREFERRED EMBODIMENTS.

Referring first to FIG. 1, the reference numeral 1 designates an objective 2 being a reticule and 3 an assembly adapted at the same time to automatically compensate the defective horizontality of the level, to erect completely the image formed by the objective of the object sighted therethrough, and also to focus the said image in the plane of said reticule 2.

The assembly 3 comprises two isoceles rectangular prisms 4 and 5 disposed side by side on a support 6 suspended from a fixed member 7 connected to the case (not shown in FIG. 1) of the automatic level by means of a pair of flexion bars 8. The flexion bars 8 extend normally vertically when the case of the automatic level is in a true horizontal position. The two prisms 4 and 5 are disposed side by side on the support 6 so that their hypotenuse faces 9 and 10, respectively, are oriented in directions perpendicular to each other and form an angle of 45 degrees, respectively, with the optical axis 11 of objective 1 and with the optical axis 12 of an eyepiece (not shown in FIG. 1) located behind the reticule 2, when the level case is in a horizontal position, i.e. with the flexion bars 8 disposed vertically. The hypotenuse faces 9 and 10 of prisms 4 and 5 act as reflecting surfaces and may if desired be replaced by mirrors. The characteristics of the two flexion bars 8, notably their length and/or cross-sectional area and/or rigidity, are so selected that when they yield as a consequence of a lack of horizontality of the automatic level case, so that the optical axes 11 and 12 of the objective 1 and of the eyepiece, respectively, form an angle $\alpha$ to the horizontal, the hypotenuse faces 9 and 10 rotate through an angle $\alpha/2$ about an axis merging substantially with the straight line containing the incidence points 9a and 10a on the hypotenuse faces 9 and 10.

The assembly 3 further comprises a third isoceles rectangular prism 13 of which the vertex 14 extend parallel to the optical axes 11 and 12. The third prism 13 is so disposed that the light rays reflected by the face 9 of prism 4 pass firstly through the hypotenuse face 15 of prism 13, are then reflected successively by the faces 16 and 17 perpendicular to each other of the same prism 13 and within the latter, and pass again through the hypotenuse face 15 towards the hypotenuse face 10 of prism 5. In addition, the prism 13 is movable in a substantially vertical direction and its vertical position can be adjusted by suitable control means (not shown in FIG. 1) to be described presently in detail.

It will be noted that the assembly 3 of prisms 4, 5 and 13 constitute a kind of "Crova" prism or "second-species Porro" prism, of which the component elements are dissociated for assembling them in the above-described manner.

Now the operation of the assembly 3 described hereinabove will be described. Firstly, it will be assumed that the level case 3 is in a strictly horizontal position. Thus, the flexion bars 8 extend vertically and the optical axes 11 and 12 are horizontal. Therefore, a horizontal light ray passing through the center of objective 1 will follow the optical axis 11 before being reflected vertically by the face 9 of prism 4 along the path 18; the light ray is subsequently reflected horizontally and perpendicularly in relation to said axis 11 and path 18, along the path 19, by the face 16 of prism 13; finally, the light ray is again reflected vertically along the path 20 by face 17 of prism 13, and horizontally along the optical axis 12 of the eyepiece by the face 10 of prism 5, so as to pass through the center of reticule 2.

Now let us assume that the level case is not exactly horizontal and that the optical axis 11 of objective 1 and the optical axis 12 of the eyepiece form for example an angle $\alpha$ to the horizontal. Thus, as already explained in the foregoing, the flexion bars 8 yeld in order to cause the faces 9 and 10 to rotate through an angle $\alpha/2$. FIG. 2 shows the path followed in this case by the horizontal light ray passing through the center of objective 1 and through the assembly 3. For the sske of convenience in the drawing, this path is illustrated as being developed in a plane and, instead of showing the horizontal incoming ray 21 in a horizontal position, it is shown as forming an angle $\alpha$ with the optical axes 11 and 12 of the objective 1 and of the eyepiece, which are shown in a horizontal position, which is tantamount to the same. It may also be reminded that when a mirror rotates through a certain angle in relation to an incident light ray, the ray reflected by the mirror rotates through an angle which is twice the rotation imparted to the mirror. Under these conditions, it is clear that the face 9 of prism 4 having rotated only through an angle $\alpha/2$, the ray 21 will rotate through an angle $\alpha$. Consequently, in actual operation the light ray reflected by the face 9 of prism 4 will remain perpendicular to the optical axes 11 and 12 and also to the face 15 of prism 13, and after being reflected by the faces 16 and 17 (FIG. 1) of prism 13, the ray will pass again through the face 15 and normally thereto towards the face 10 of prism 5. Since the face 10 has also been rotated through an angle $\alpha/2$, the ray reflected by said face 10 will be deflected again by an angle $\alpha$ as shown in FIG. 2. Thus, it will be seen that if provisions are made for causing the distance L between the objective 1 and the reflecting face 9 of prism 4, measured along the optical axis 11 of said objective, to be equal to the distance L between the reflecting face 10 of prism 5 and the reticule 2, measured along the optical axis 12 of the eyepiece, the outcoming ray 22 will pass through the center of said reticule 2. Therefore, this will provide the desired compensation. It will be noted that the prism 13 does not take any part in this compensation, since it reflects the light rays in a plane normal to the optical axes 11 and 12.

The assembly 3 illustrated in FIG. 1 is also capable of erecting completely the image and also of focusing the latter in the plane of reticule 2. In fact, as will be clearly apparent to those conversant with the art, the reflecting faces 9 and 10 erect in the top to bottom direction the inverted image issuing from the objective 1, while the other reflecting faces 16 and 17 erect the same image in the right-to-left direction. Moreover, since the prism 13 is vertically movable, the length of the optical path between said objective 1 and the reticle 2 can be varied, so that the image formed by the objective 1 can be brought within the plane of said reticule 2.

Now a concrete embodiment of the present invention will be described with reference to FIGS. 3 to 6 of the drawing. The automatic level illustrated in FIGS. 3 to 5, which includes an assembly 3 similar to the one illustrated in FIG. 1, comprises a case 23 supported by a base 24 provided with means 25 permitting, in combination with an air bubble level 26 secured to said case 23, a rough adjustment of the horizontality of said case 23. The base 24 may be constructed for example as disclosed in U.S. Pat. No. 3,931,947.

The objective 1 and an eyepiece 27 are mounted in opposite vertical walls of said case 23 so that their optical axes 11 and 12 be parallel to each other and lie in a common horizontal plane when the case is also in a horizontal position. The reticule 2 is so mounted as to lie in the focal plane of eyepiece 27.

The support 6 to which the two prisms 4 and 5 are secured is suspended from the fixed element 7 by means of a pair of flexion bars 8 having their ends fitted in said support 6 and said fixed element 7, respectively. Said fixed element 7 is connected to the case 23 by means of a wedge-type adjustment device 28 (FIG. 3 and 4), whereby the vertical position of prisms 4 and 5 in relation to the optical axes 11 and 12 can be factory-adjusted or set in such a manner that these two optical axes intersect the faces 9 and 10, respectively, of prisms 4 and 5 in a common vertical plane perpendicular to said axes 11 and 12.

The prism 13 is secured to another support 29 (FIGS. 3 and 6). As shown in FIG. 6, the support 29 is guided vertically by a rod 30 secured to the upper wall of case 23, which extends vertically downwards inside the case 23. An abutment member consisting for example of a screw 31 engaging a tapped hole formed in the lower end of said rod 30 is provided for limiting the downward vertical movement of said support 29. The vertical position of the support 29 may be adjusted by means of a threaded rod 32 having its lower end engaged in a tapped hole formed in said support 29, the upper end of said threaded rod 32 projecting outside the case 23 and carrying a control knob 33. A spring 34 constantly urges the support 29 vertically downwards. It is clear that by rotating said control knob 33 in one or the other direction the operator can move the support 29 and prism 13 vertically up or down, so that the image can be focused as explained hereinabove.

On the other hand, the automatic level according to this invention comprises in a manner known per se a device 35 for damping or absorbing the oscillations of support 6 which occur inevitably when fitting the apparatus in position. In the embodiment illustrated in the drawing the damping device 35 is of the magnetic type and comprises a plate 36 of conductive material, which is secured to the support 6 and is movable between the two poles of a permanent magnet 37. Of course, other types of damping devices could be substituted for the magnetic damper 35.

Of course, the embodiment of the invention which is described hereinabove with reference to the attached drawing is given by way of illustration, not of limitation, since many modifications may be brought thereto without departing from the basic principles of the invention as set forth in the appended claims.

What is claimed as new is:

1. In an automatic level comprising a case, a base supporting said case, means permitting a coarse adjustment of the horizontality of said case, an objective and an eyepiece mounted in said case so that their optical axis be parallel to each other and lie in a common horizontal plane when the case is in a horizontal position, a fixed reticule disposed in the object focal plane of the eyepiece, a compensator suspended from said case and disposed on the path of the light rays between said objective and said reticule, an image erecting optical system disposed between said objective and said reticule, and an image focusing device, and in which the compensator and the image erecting system comprise an assembly of four reflecting surfaces disposed in the fashion of a "Crova" prism or "2nd-species Porro" prism, said assembly comprising in succession on the path of the light rays an input reflecting surface, a pair of intermediate reflecting surfaces and an output reflecting surface, said input and output reflecting surfaces being so disposed side by side on a support that they are oriented in directions perpendicular to each other and form an angle of 45° with the optical axis of the objective and with the optical axis of the eyepiece, respectively, when said support is in a horizontal position, said pair of intermediate reflecting surfaces being vertically spaced from said input and output reflecting surfaces and being disposed perpendicular to each other and parallel to the optical axes of said objective and eyepiece, said support being suspended from the case by means of a pair of flexion bars so selected that the input and output reflecting surfaces can rotate through an angle equal to one-half of an angle formed by the optical axes of said objective and eye-piece, respectively, with the horizontal when said case departs slightly from its horizontal position, the distance between the objective and the input reflecting surface, as measured along the optical axis of the objective, being equal to the distance between the output reflecting surface and the reticule, as measured along the optical axis of the eyepiece, the improvement consisting in that: the pair of intermediate reflecting surfaces is secured to another support movable substantially vertically within the case, control means are provided for adjusting the vertical position of said other support and of said pair of intermediate reflecting surfaces secured thereto, whereby said pair of intermediate reflecting surfaces and said control means can act as said focusing device, and adjusting means are provided for allowing to set the vertical position of said input and output reflecting surfaces in relation to the optical axes of said objective and eyepiece, so that said optical axes intersect said input and output reflecting surfaces, respectively, in a common vertical plane perpendicular to said optical axes.

2. Automatic level according to claim 1, wherein said support for said input and output reflecting surfaces is suspended from a fixed element by means of said pair of flexion bars, and said fixed element is connected to said case through said adjusting means.

3. Automatic level according to claim 2, wherein said adjusting means is a wedge-type adjustment device.

4. Automatic level according to claim 1, wherein said other support is guided vertically by a first rod secured to an upper wall of said case and extending vertically downwards inside said case, and said control means comprise a second vertically extending rod which is rotatably mounted in said upper wall of said case, said second rod having a threaded lower end engaged in a tapped hole formed in said other support and an upper end projecting outside the case and provided with a control knob, and a spring which constantly urges said other support vertically downwards.

* * * * *